United States Patent [19]

Audeh et al.

[11] 4,208,263
[45] Jun. 17, 1980

[54] SOLVENT EXTRACTION PRODUCTION OF LUBE OIL FRACTIONS

[75] Inventors: Costandi A. Audeh, Princeton, N.J.; Tsoung Y. Yan, Philadelphia, Pa.

[73] Assignee: Mobil Oil Company, New York, N.Y.

[21] Appl. No.: 12,278

[22] Filed: Feb. 15, 1979

[51] Int. Cl.$^2$ .............................................. B03C 5/00
[52] U.S. Cl. ................................... 204/188; 204/136
[58] Field of Search ............... 204/130, 136, 186, 188, 204/189, 190

[56] References Cited

U.S. PATENT DOCUMENTS 3,437,575  4/1969  Gross et al. ............................ 204/86

Primary Examiner—T. M. Tufariello
Attorney, Agent, or Firm—Charles A. Huggett; Raymond W. Barclay; Claude E. Setliff

[57] ABSTRACT

An improved solvent extraction process is described for the preparation of lube oil products, the improvement whereby the extract phase is subjected to a voltage gradient.

4 Claims, 2 Drawing Figures

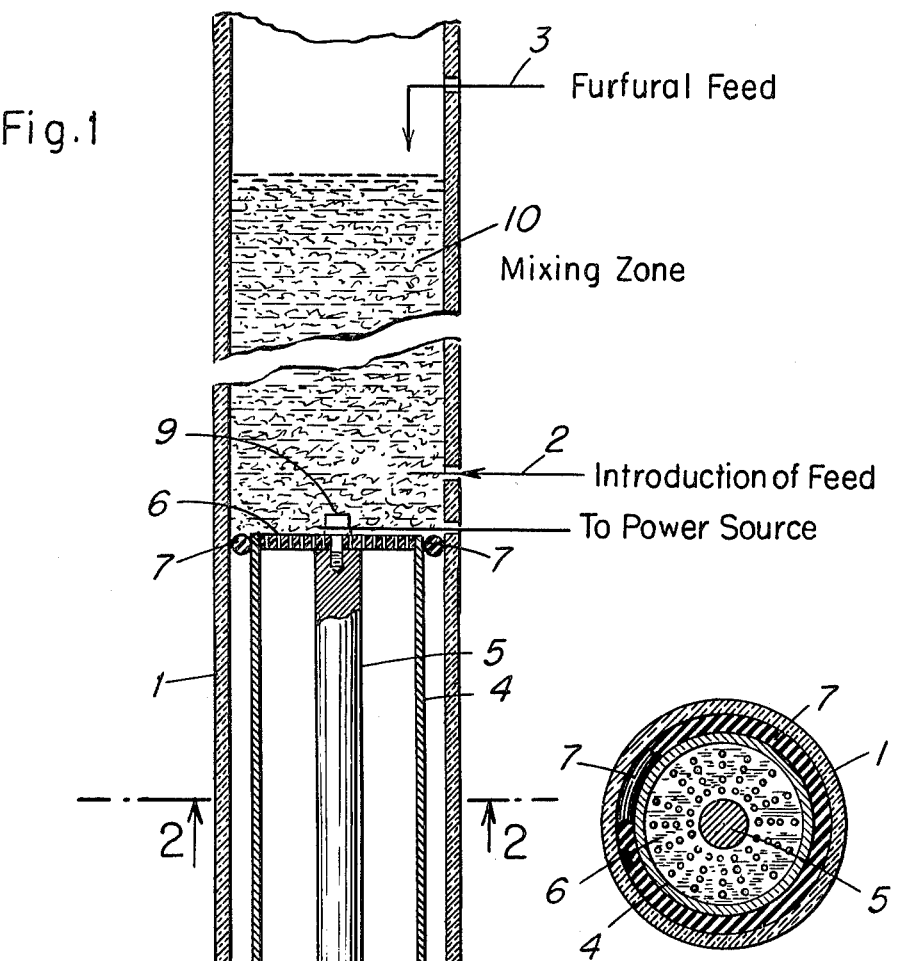

SOLVENT EXTRACTION PRODUCTION OF LUBE OIL FRACTIONS

BACKGROUND OF THE INVENTION

1. Field of the Invention

The invention relates to a process for producing lube oil fractions by solvent extraction. It more particularly relates to an improvement to such process whereby a voltage gradient is maintained in the extract phase.

2. Discussion of the Prior Art

Solvent extraction is a well established process used in the refining of petroleum, the first application having been made in about 1911. Originally, upgrading of kerosine was a major use but the improvement obtained in solvent extracting lubricating oils and other products soon became an important application. Solvent extraction is used extensively in the petroleum refining industry to refine lubricating oils, kerosine and specialty oils for medicinal and agricultural purposes. It is also used for upgrading charge stocks for catalytic cracking operations as well as for separating light aromatics from gasoline. Solvent extraction is a process that separates hydrocarbon mixtures into two phases; a raffinate phase which contains substances of relatively high hydrogen to carbon ratio, often called paraffinic type materials, and an extract phase which contains substances of relatively low hydrogen to carbon ratio, often called aromatic type materials. Therefore, it may be said that solvent extraction is possible because different liquid compounds have different solution affinities for each other, and some combinations are completely miscible while other combinations are almost immiscible. The ability to distinguish between high carbon to hydrogen aromatic type and low carbon to hydrogen or paraffinic type materials is termed selectivity. The more finely this distinguishing can be done the higher the selectivity of the solvent.

SUMMARY OF THE INVENTION

In accordance with the invention there is provided an improved method of producing lubricating oils by solvent extraction which comprises contacting a lube oil-containing hydrocarbon charge under conditions of solvent selectivity to permit the recovery of a raffinate phase which, upon dewaxing, will provide a lube oil product, preferably one having a viscosity index of at least 90, the improvement whereby the extract phase is subjected to a voltage gradient of from about 2 to about 200 volts, preferably about 80 to about 120 volts at from about 0.4 milliamps to about 50 milliamps, preferably from about 20 to about 30 milliamps.

BRIEF DESCRIPTION OF THE DRAWING

FIG. 1 shows one arrangement of an apparatus for carrying out the invention.

FIG. 2 is a cross section, vertical view of the electrical cell included in FIG. 1.

DESCRIPTION OF SPECIFIC EMBODIMENTS

Oil is made up of compounds consisting of paraffins and of naphthenic and aromatic rings carrying side chains of varying number, length and structure. Long side chains are characteristic of molecules of high paraffinicity and high viscosity index, while polynaphthenic and polyaromatic structures with fewer and shorter chains will show low viscosity index and high viscosity-gravity constant. The division between compounds of long and short side chains, therefore, is necessarily not sharp and undoubtedly some constituents of high VI are lost in any extraction process. Furthermore, it has been demonstrated that the "purity" of a vacuum distillate plays an important role in its solvent extraction characteristics. For example, laboratory settling time, at equilibrium phase separation, as well as extraction yield at a commercial extraction unit, are related to distillate quality and its deterioration. In searching for a method for improving the separation qualities of a distillate during extraction without the necessity for upgrading such distillate led to the discovery of the present method. In addition to the fact that phase separation is enhanced, the yield of raffinate is also increased.

Terms which are used extensively in solvent extraction operations include "solvent" for the extracting agent, "solute" for the readily soluble material in the feed "extract" for the material removed from the feed, "raffinate" for the non-dissolved product, "reflux" for extract material returned to the extractor and "rich solvent" for the solvent extract solution withdrawn from the extractor.

Solvents which have been used in commercial operations include furfural, phenol, cresylic acid, nitrobenzene, dichloroethyl ether, sulfur dioxide and others. If desired, these solvents may be used in the presence of diluents such as benzene, carbon disulfide, ethers and carbon tetrachloride. Generally, the diluents increase the solubility of all of the hydrocarbons. The use of diluents however can reduce solvent selectivity.

Furfural is a preferred solvent extraction agent for lubricating oil production. Its solubility characteristics and its chemical and physical properties permit use with both highly aromatic and highly paraffinic oils of wide boiling range. Light and heavy lubricating stocks are usually refined with furfural. For lubricating oils it has been used in the prior art at elevated temperatures in the range of 120° F. to 290° F. and with from 1 to 4 volumes to furfural to 1 volume of oil. While this broad range of furfural to oil ratio can be used in our invention, we prefer to use a ratio of from about 1.0 to about 3.5, and more preferably from about 1.5 to about 2.8.

In a typical furfural solvent extraction plant for lubricating oils (and one of which is applicable to the present process, at least that portion of it prior to electrical extraction), the raw feed or distillate fraction, at a temperature of about 110° to about 300° F. and depending upon the nature of the oil, is introduced below or at about the center of the extraction tower. Furfural is fed into the top or upper portion of the tower at a somewhat narrower range of temperatures selected from within the range of about 150° F. to about 290° F. Recycle extract may be introduced into the lower section of the tower as reflux. Likewise, internal reflux is effected in the tower by the temperature gradient which is brought about by introducing the solvent at an elevated temperature and by intermediate cooling systems. Furfural solvent is recovered from the raffinate and extract phase streams or layers in suitable distillation and stripping equipment. The stripped and recovered solvent is then returned or recycled for use in the process as above described.

Finished lubricating base oils are generally divided into the following three broad grade classifications:

|  | Viscosity Range, Saybolt Seconds Universal | Boiling Range, °F. |
| --- | --- | --- |
| Light neutrals | 100–250 at 100° F. | 650°–900° F. |
| Heavy neutrals | 350–750 at 100° F. | 850°–1000° F. |
| Bright stocks | 110–200 at 210° F. | >950° F. |

The light and heavy neutrals are normally produced from adjacent boiling vacuum tower distillates that are solvent extracted and dewaxed. The bright stock is produced from the vacuum tower residuum remaining after the light and heavy neutral distillates have been boiled off. The residuum is first deasphalted and the deasphalted oil is then solvent extracted and dewaxed. It has been found that these three grades of unrefined stocks from any given lube crude have markedly different refining requirements to achieve normal quality levels are measured by viscosity index. The heavier higher boiling stocks from a crude are more difficult to refine to a given viscosity index level than is the adjacent lower boiling fraction. Therefore, under the conditions described in this invention, "high" viscosity index products from a given crude will vary with viscosity grade as follows:

|  | High viscosity index product |
| --- | --- |
| Light neutral | 95–115 |
| Heavy neutral | 95–105 |
| Bright stock | 90–100 |

These numerical V.I. levels thus represent equivalent extraction severities for the several viscosity grades of products. The V.I. rating of lubricating oil products can then be generally described in terms of any one of these viscosity grades in accordance with this relationship.

Crude oils are classified by the Bureau of Mines into three categories according to the predominant composition of their 736°–788° F. fraction as paraffinic, intermediate and naphthenic. Paraffinic crude such as Pennsylvania or High Pour Libyan crudes contain considerable amounts of wax, while some naphthenic crudes such as coastal crudes contain no wax. Intermediate crudes such as Mid-Continent, Kuwait or East Texas contain varying amounts of wax. Thus, it can be seen that crude source is especially important in the manufacture of premium lubricants as various lubrication duties require oils of different chemical composition and properties.

Results of a relatively broad literature review indicate that relatively high V.I. lube oil components, above about 120 V.I. are present in many crude lube oil fractions. However, recovery of these high V.I. components in a stable oil fraction has been the subject of considerable investigation. It has been found upon review of the prior art and literature methods for recovering high V.I. lube oil constituents that the processes employed are generally regarded as exotic extraction and distillation schemes which are of little or no commercial interest primarily because of cost involved.

Basically, all extraction processes are similar. Each consists of facilities to contact the oil with a selective solvent that separates by extraction one or more types of the oil constituents from other types of oil constituents plus facilities to separate solvent from the extract and raffinate streams thus obtained. The solvent must be recovered in substantially every circuit of the system. As large amounts of solvent are circulated, the heat requirements are high and, unless employed in an extremely efficient manner, they constitute one of the major operating expenses. The normal extraction equipment is relatively simple but the solvent recovery facilities are necessarily complex and therefore expensive and any means by which these costs or facilities can be simplified contribute to the commercial interests of the process.

In carrying out the present invention, 1 part of the distillate to be extracted is introduced at the lower part of the mixing zone, the packed section of an extraction unit, for example, as exemplified in FIG. 1 where it moves toward the top of thereof. Concurrently, about 1.0 to about 4.0, preferably about 1.5 to about 2.8 volumes of furfural per volume of oil are introduced at the top part of the mixing zone in the extraction unit where it moves downward toward the bottom of the unit. Distillate moving up meets furfural moving down, effects the desired extraction and results in the separation of two phases, a raffinate phase and an extract phase. Normally, the raffinate phase exits the extraction unit at the top and the extract phase at the bottom. In this invention the extract phase is made to pass through a compartment containing a set of positive and negative electrodes, where an electric potential is applied. The direct current potential applied to the extract phase effects an improvement in the yield of raffinate in the solvent extraction of crude oil distillate fractions from which lubricating oils are manufactured.

The extraction unit is operated so that the mixture will move in the mixing zone at a linear velocity from about 0.5 to about 1.8 cm. per minute, preferably from 0.8 to 1.1 cm. per minute, and the extract phase in the electric cell, where the electric potential is applied, at a linear velocity from about 0.7 to about 2.4 cm. per minute, preferably from 1.1 to 1.5 cm. per minute. The temperature in the extraction unit can range overall from about 110° F. to about 300° F.

EXAMPLE

The extraction of this example was carried out in a continuous extraction unit 1 made of a glass column having an ID of 17 mm. as shown in FIG. 1. A mixing zone 10 was packed with 125 ml. of 0.24 inch "Propak", and the column was associated with metering pumps, heaters, heater controls and a level controller to prevent flooding. The settling zone of the unit was a 28 cm. section of the glass column in which was placed a 21 cm. length of 15 mm. OD stainless steel tube 4 held inside the column by two teflon perforated discs 6 (one at the top of the tube 4, one at the bottom thereof) fitted with o-rings 7. One electrical connection 8 was connected to the tube 4 and to a power source. The inner electrode 5 was a 21 cm. length of 5 mm. diameter stainless steel rod equipped with two screws 9 used to fasten it to the center of the telfon discs. The top screw also serves as the second electrical connection to the power source. One part of feed, which has the following properties:

TABLE 1

| Gravity, °API | 18.8 |
| --- | --- |
| Sp. Gravity, 60/60° F. | 0.9415 |
| Pour Point, °F. | 115 |
| Neut. No. | 0.14 |
| Aniline Point, °F. | 191.4 |
| Refractive Index, 158° F. | 1.5074 | was introduced at 2 (depicting any convenient location at the bottom of the mixing zone 10, but above the settling zone). The total extraction unit, including the settling zone, was maintained at 225° F. An amount of furfural equivalent to 2.5 volumes per volume of the oil was introduced into the top of mixing zone 10 at 3, which depicts any convenient entrance point at or near the top of the column. The oil and furfural mixed therein and separated into a raffinate phase, which exited the top, and an extract phase, which entered the settling zone where it is exposed to the voltage gradient. The average linear velocity through the upper column was about 1.0 cm. per minute. In the 0.5 cm. annulus between the electrodes the velocity was estimated to be about 1.4 cm. per minute. The data obtained is shown in Table 2.

TABLE 2

| Example | Volts[a] Current[b] | Yield, Vol. % | Gravity API | Aniline Point, °F. | Refractive Index, 158° F. |
|---------|---------------------|---------------|-------------|--------------------|-----------------------------|
| 1 | — | 55.0[1] | 28.5 | 236.8 | 1.4677 |
|   |   | 45.0[2] | 7.5 | 97.7 | — |
| 2 | 4/0.9 | 56.0[1] | 28.1 | 236.4 | 1.4690 |
|   |   | 44.0[2] | 7.5 | 98.8 | 1.5572 |
| 3 | 100/25 | 58.0[1] | 28.3 | 235.4 | 1.4685 |
|   |   | 42.0[2] | 6.9 | 99.5 | 1.5547 |

[1] Raffinate.
[2] Extract.
[a] DC
[b] Milliamps

I claim:

1. An improved method of producing lubricating oils by solvent extraction which comprises contacting a lube oil-containing hydrocarbon charge under conditions of solvent selectivity to permit the recovery of a raffinate phase which upon dewaxing will provide a lube oil product, the improvement whereby the extract phase, at a temperature of from about 100° to about 300° F., is passed through an electrical cell at from about 0.7 to about 2.4 cm. per minute while being subjected to a voltage gradient of from about 2 to about 200 volts at from about 0.4 to about 50 milliamps, resulting in improved yields of raffinate and reduced yields of extract.

2. The method of claim 1 wherein said raffinate phase, upon dewaxing will provide a lube oil product having a V.I. of at least 90.

3. The method of claim 1 wherein the oil is contacted with from about 1 to about 4 volumes of furfural per volume of oil.

4. The method of claim 1 wherein the temperature throughout is about 225° F.

* * * * *

UNITED STATES PATENT AND TRADEMARK OFFICE
CERTIFICATE OF CORRECTION

PATENT NO. : 4,208,263

DATED : June 17, 1980

INVENTOR(S) : CONSTANDI A. AUDEH and TSOUNG Y. YAN

It is certified that error appears in the above-identified patent and that said Letters Patent are hereby corrected as shown below:

[73] "Mobil Oil Company" should be --Mobil Oil Corporation--.

Signed and Sealed this

Thirtieth Day of December 1980

[SEAL]

Attest:

SIDNEY A. DIAMOND

Attesting Officer

Commissioner of Patents and Trademarks